United States Patent [19]

Clausen et al.

[11] 4,387,411
[45] Jun. 7, 1983

[54] APPARATUS AND METHOD FOR CLEANING A VIDEO PLAYER/RECORDER

[75] Inventors: Eivind Clausen; James D. Allsop, both of Bellingham, Wash.

[73] Assignee: Allsop, Inc., Bellingham, Wash.

[21] Appl. No.: 223,025

[22] Filed: Jan. 6, 1981

Related U.S. Application Data

[63] Continuation-in-part of Ser. No. 109,650, Jan. 4, 1980.

[51] Int. Cl.³ .................................................. G11B 5/41
[52] U.S. Cl. ...................................... 360/128; 360/85; 360/95; 360/137
[58] Field of Search .................... 360/128, 137, 85, 95; 15/210 R

[56] References Cited

U.S. PATENT DOCUMENTS

| | | | |
|---|---|---|---|
| 3,647,990 | 3/1972 | Eul, Jr. et al. | 360/128 |
| 3,931,643 | 1/1976 | Kuroe | 360/128 |
| 3,964,104 | 6/1976 | Herron et al. | 360/128 |
| 4,141,053 | 2/1979 | Kara | 360/128 |
| 4,211,580 | 7/1980 | Yowles | 360/137 X |

FOREIGN PATENT DOCUMENTS

| | | | |
|---|---|---|---|
| 52-75426 | 6/1977 | Japan | 360/128 |
| 2073470 | 10/1981 | United Kingdom | 360/128 |

*Primary Examiner*—John H. Wolff
*Attorney, Agent, or Firm*—Hughes, Barnard & Cassidy

[57] ABSTRACT

A cassette-like housing containing a cleaning ribbon which is wound on a pair of spools. The housing is placed in the video player/recorder apparatus, and the apparatus is operated so that the cleaning ribbon, located the forward part of the cassette, is pulled outwardly from the cassette-like housing into cleaning engagement with the rotating head of the apparatus and also in engagement with other components of the apparatus. At completion of the cleaning cycle, the cleaning ribbon is retracted into the cassette-like housing.

30 Claims, 11 Drawing Figures

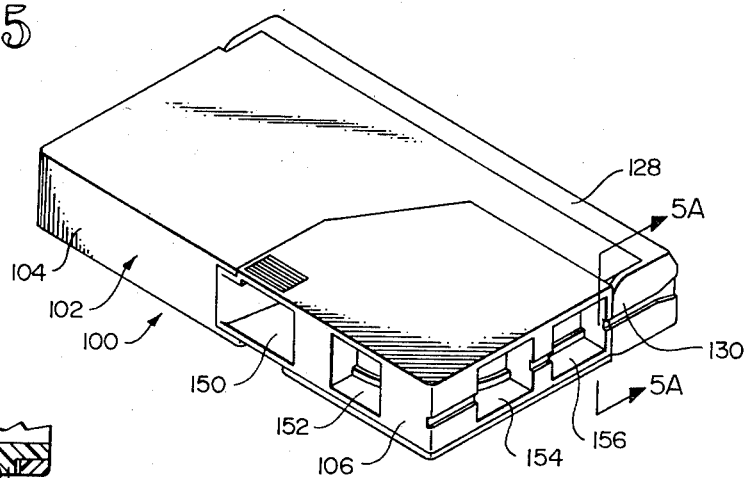
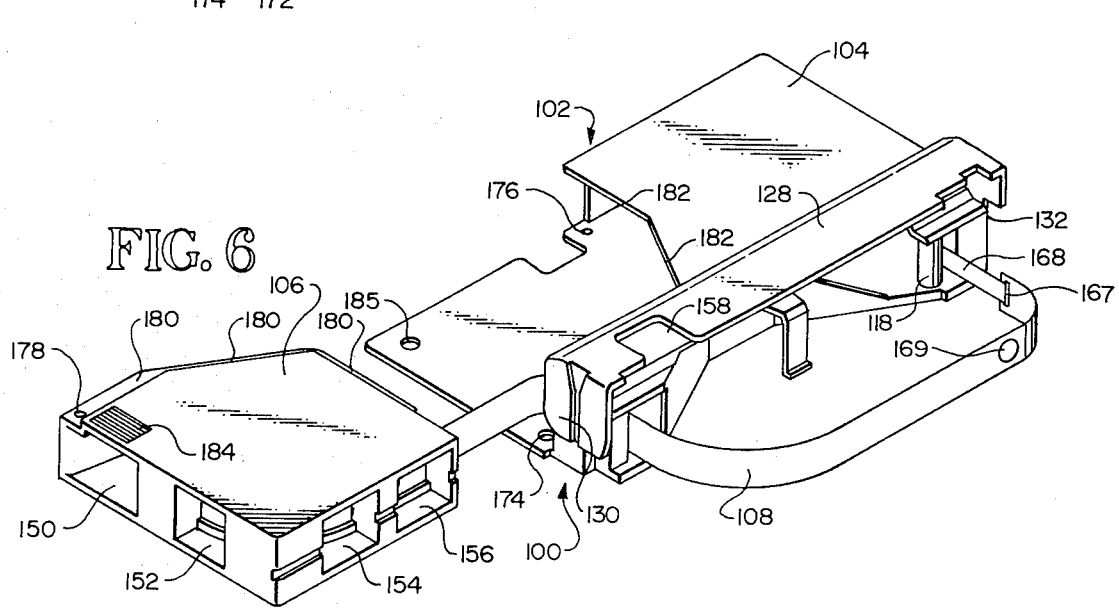
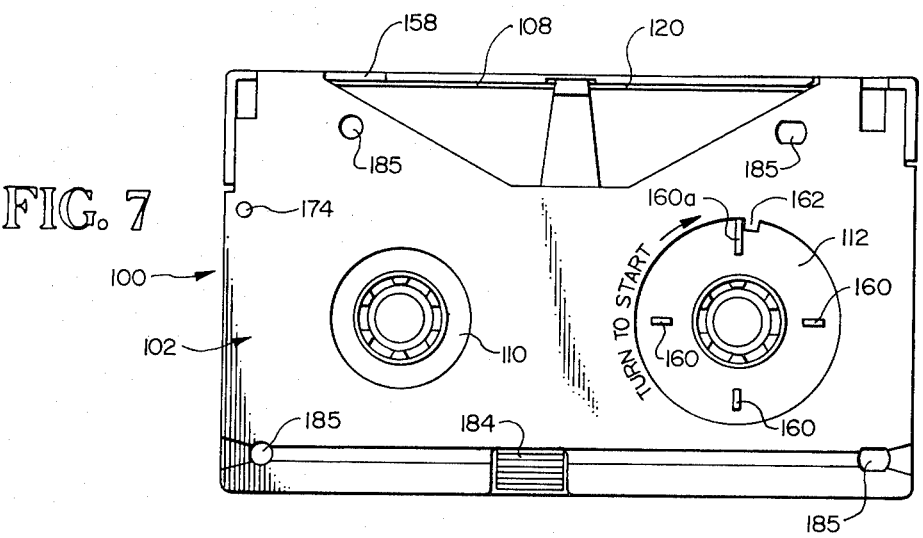

APPARATUS AND METHOD FOR CLEANING A VIDEO PLAYER/RECORDER

This is a continuation-in-part application to our pending U.S. patent application, Ser. No. 06/109,650, filed on Jan. 4, 1980, entitled "Video/Player Recorder Cleaning Apparatus and Method".

TECHNICAL FIELD

The present invention relates to a method and apparatus for cleaning operating components of a video player/recorder.

BACKGROUND ART

In recent years, video player/recorders have become very popular. Typically, there is a video head which either records or plays back the video portion of a playing tape, an audio head which performs the same function for the sound portion of the tape, an erase head, and possibly other components which engage the tape. For proper operation of the player/recorder, it is desirable that the surface portions of at least the video and audio head, and in some instances other components that contact the playing tape, be cleaned periodically.

Particularly for cassette player/recorders, this cleaning operation can be rather difficult. In a typical cassette player/recorder, there is a rectangular cassette recess into which the cassette containing the playing tape is placed. The video head and the audio head of the machine are positioned within the housing of the player/recorder, and are spaced a moderate distance away from the open cassette recess. When the player/recorder is operated, a number of guides that are part of the player/recorder apparatus engage the tape in the cassette case and move the tape outwardly into engagement with the playing/recording heads. The locations of these heads are sufficiently inaccessible so that cleaning the heads by means of some manually operated instrument is at best a clumsy operation, and can possibly damage the more delicate components.

Another problem is that the video playing/recording head is a delicate component which should be handled with a high degree of care. A typical video head is in the shape of a disc having a circumferential operating surface which engages the surface of the playing tape. On the peripheral surface of the video head, there is at least one (and in some instances a plurality) of scanning elements. The video head is mounted for rotation about a circular path that is slightly angled or canted with respect to the longitudinal axis of the playing tape. In operation, the video head is rotated at a very high rate, in the order of one to two thousand revolutions per minute, with the elements scanning the tape on each revolution. In bringing any sort of cleaning device into contact with the video head, extreme caution should be exercised in avoiding any damage to the operating elements of the video head. Also, with the video head rotating at such high speed, the torque of the drive for the video head is necessarily small, so that care should be exercised in not creating any substantial amount of frictional resistance against the peripheral surface of the head, since it is possible that such resistance would substantially reduce the rate of rotation and possibly damage some of the operating components.

A search of the patent literature disclosed a number of U.S. patents, these being discussed below.

U.S. Pat. No. 3,647,990, Eul Jr. et al, discloses a cleaning and demagnetizing device where there is a cleaning tape rotatably mounted about a spindle. A demagnetizing element is gradually moved away from the playing head by a reduction in diameter of the winding of the cleaning tape.

U.S. Pat. No. 3,761,994, Becht, shows a manually operated lever which can be moved back and forth to clean the head of a magnetic tape recording/playing unit. This lever is mounted in a cartridge which is placed in the aperture or recess of the unit.

U.S. Pat. No. 3,955,214, Post, shows a cassette housing containing a device to clean the playing head of a magnetic tape recorder/playing unit. There is a cam member rotatably mounted so as to be driven by one of the drive spindles of the unit. The cam member causes back and forth motion of an operating lever, which in turn causes a cleaning element to move back and forth across the playing/recording head.

U.S. Pat. No. 4,141,053, Kara, discloses a cassette-type cleaner for a magnetic tape recording/playback unit. In operation, the capstan of the unit engages a rubber pad which starts rotation of a gear-train which rotates a cleaning member that is in contact with the playing/recording head.

U.S. Pat. No. 4,149,206, Loiselle, discloses a device for cleaning the head of a magnetic tape recorder/playing unit, where there is a lever arm which moves a cleaning element back and forth across the head. There is an eccentrically mounted circular cam which is driven by one of the spindles of the unit to cause back and forth movement of the lever.

In some video player/recorder units, some of the operating components are placed so that the tape must be moved by the guide members a relatively large distance into the operating area of the unit to engage the operating components. Because these components are relatively inaccessible, they are particularly difficult to be cleaned effectively, and be cleaned so as not to damage the more delicate components. In view of this, it is an object of the present invention to provide a method and apparatus which can effectively and reliably clean operating components of a video player/recorder, particularly where the operating components are relatively inaccessible and susceptible to being damaged.

DISCLOSURE OF THE INVENTION

There is a cleaning device particularly adapted for use with a playing and/or recording apparatus where there is a head member that has a head surface that is subject to contamination, and also guide means movable between a first retracted position and a second operating position so as to move a tape into operating engagement with the head member. The device is particularly adapted to clean at least the head surface.

The device of the present invention comprises a housing adapted to be mounted in an operating position relative to the apparatus. There is a cleaning ribbon which has a cleaning portion and which is mounted in the housing so as to have a retracted precleaning position at which the cleaning portion is positioned at a precleaning location in the housing.

The housing is arranged relative to the ribbon in the manner that with the ribbon in its precleaning position, the cleaning portion is exposed in the housing at the precleaning position. Thus, the cleaning portion is able to have a cleaning material applied to the cleaning portion when in the precleaning position in the housing.

The device is so arranged that with the housing mounted in its operating position, and with the guide means moving to its extended position, the ribbon is positioned by the guide means in an extended cleaning position. In this position, the cleaning portion comes into engagement with the head surface so as to perform the cleaning operation.

In the preferred form, the ribbon has a second guide engaging portion spaced from the cleaning portion. This guide engaging portion in the precleaning position is located so as to be engaged by the guide means moving from its retracted position to its operating position so as to be moved outwardly from the housing and thus move the cleaning portion of the ribbon into its extended cleaning position.

A further feature of the preferred embodiment is that the ribbon is movable along its length in the housing. The device further comprises a locating means mounted to the housing and operatively connected to the ribbon to locate the ribbon along its length in its precleaning position. Desirably, the locating means further comprises a positioning member to position the locating means so that the ribbon is brought to its precleaning position. In the preferred form, the locating means comprises a rotatably mounted spool engaging the ribbon. Also, in the preferred form, the spool and housing have cooperating stop means which come into engagement when the spool has been rotated to its precleaning position.

The device is particularly adapted to be used with a playing and/or recording apparatus that has a drive system which in its usual operation moves the tape through the apparatus, and also a stop mechanism responsive to a stop actuating means on the tape. With this arrangement, the ribbon is adapted to be engaged by the drive system when the ribbon is in its extended cleaning position so as to be moved relative to the head through a cleaning cycle. The ribbon has a ribbon stop means adapted to activate the stop mechanism to stop the ribbon at completion of said cleaning cycle. When the ribbon is in its precleaning position, the stop means is spaced along the length of the tape from the stop mechanism.

The present invention is particularly adapted to be used with a playing and/or recording apparatus so arranged that as the guide means moves to its second operating position, the tape that is normally played is caused to be positioned in a predetermined curved path. The present invention comprises a limiting means adapted to operatively engage at least a portion of the guide means as the guide means moves to its second position so as to restrain that portion of the guide means at a third intermediate position. In this intermediate position, the ribbon is in a more relaxed curved path relative to the curved path of the tape, whereby there is reduced frictional resistance to movement of the ribbon in its cleaning position. Desirably, the limiting means comprises a limiting member and spring means that acts on the limiting member to urge the limiting member toward its retracted position. Also, to accomodate variations in the guide means of the apparatus, the limiting member has an elongate slot to receive that portion of the guide means. In the specific form shown herein, the limiting means comprises a first link pivotally mounted to the housing and a second link pivotally mounted to the first link, with the elongate slot means being formed in the second link.

In the method of the present invention, there is provided a housing, with a cleaning ribbon, and access opening means in the housing. The cleaning ribbon is positioned in its precleaning position so that the cleaning portion is positioned at the access opening means. A cleaning material is applied to the cleaning portion of the ribbon. Then the housing is mounted to the apparatus, and the apparatus operated to cause the guide means to engage the ribbon and cause the cleaning portion with the cleaning material thereon to engage the head surface.

In the preferred form, the positioning of the ribbon in its precleaning position is accomplished by rotating a spool in the housing to wind the tape thereon to the proper precleaning location. Desirably, this rotation of the spool is continued until stop means on the spool engages cooperating stop means on the housing.

In the method, the cleaning ribbon is moved relative to the head by engaging the ribbon with the drive system of the apparatus and moving the ribbon along its length. A cleaning cycle of the ribbon is completed by providing the ribbon with stop means which in the precleaning position is spaced from the stop mechanism. The stop means then activates the stop mechanism to complete the operation.

Other features of the present invention will become apparent from the following detailed description. It is to be understood that the present invention is not to be limited to the specific apparatus and steps disclosed herein, but that modifications could be made within the scope of the present invention.

BRIEF DESCRIPTION OF THE DRAWINGS

FIG. 5 is an isometric view looking downwardly toward the right rear corner of the cleaning device of the present invention;

FIG. 5A is a sectional view taken at line 5A—5A of FIG. 5;

FIG. 6 is an isometric view looking downwardly on the right front corner of the device of the present invention, and showing the cartridge portion of the present invention removed from the main cassette housing;

FIG. 7 is a plan view looking at the bottom surface of the device shown in FIG. 5;

BEST MODE FOR CARRYING OUT THE INVENTION

As indicated previously, the present invention is particularly adapted to cleaning the operating components of a video recording/playing unit which is adapted to accept cassette-type playing tapes, and which has the operating components that engage the tape at relatively inaccessible locations in the operating area of the unit. Such a unit is one which is currently marketed under the trademark "BETAMAX", manufactured by the Sony Company of Japan. Accordingly, it is believed that a clearer understanding of the present invention will be obtained by first describing the operating components of the "BETAMAX" video playing/recording unit.

Figure 1:
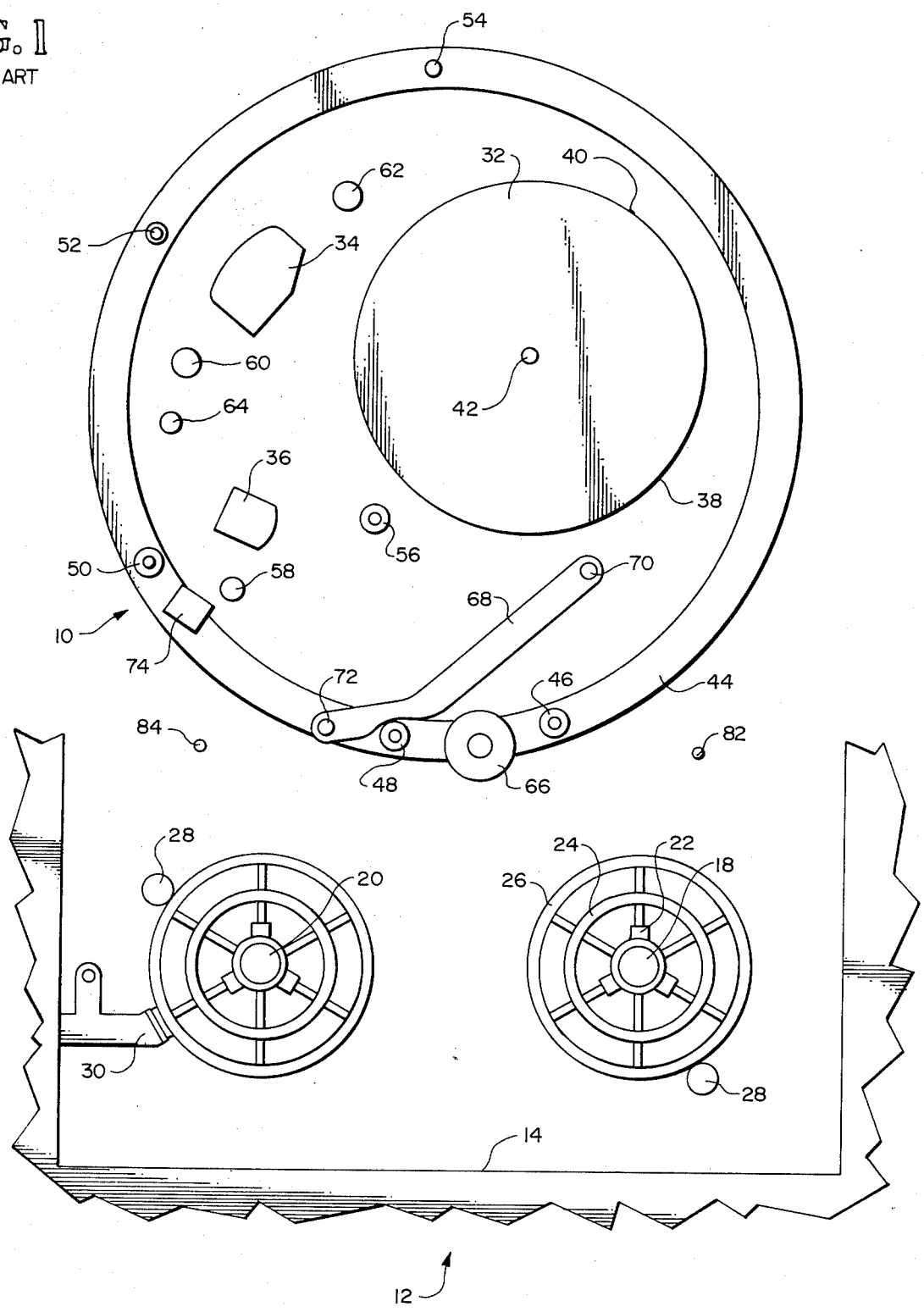
FIG. 1 is a semi-schematic plan view looking down on the main operating components of a video player/recorder for which the present invention is particularly adapted.

In the following description, the video playing/recording unit 10 will be referred to as "the video unit" or simply as "the unit". With reference to FIG. 1, the term "forward" and "rear" will denote proximity to those portions of the unit 10 shown at, respectively, the upper and lower parts of FIG. 1. In like manner, the terms "right" and "left" will denote proximity to the portions of the unit 10 shown at the right and left parts of the drawing of FIG. 1.

Before proceeding further, it should be emphasized that the components shown in FIGS. 1 through 4 (which will now be described) already exist in the prior art, and the present invention is adapted to be used in cooperation with such prior art apparatus.

Figure 2:
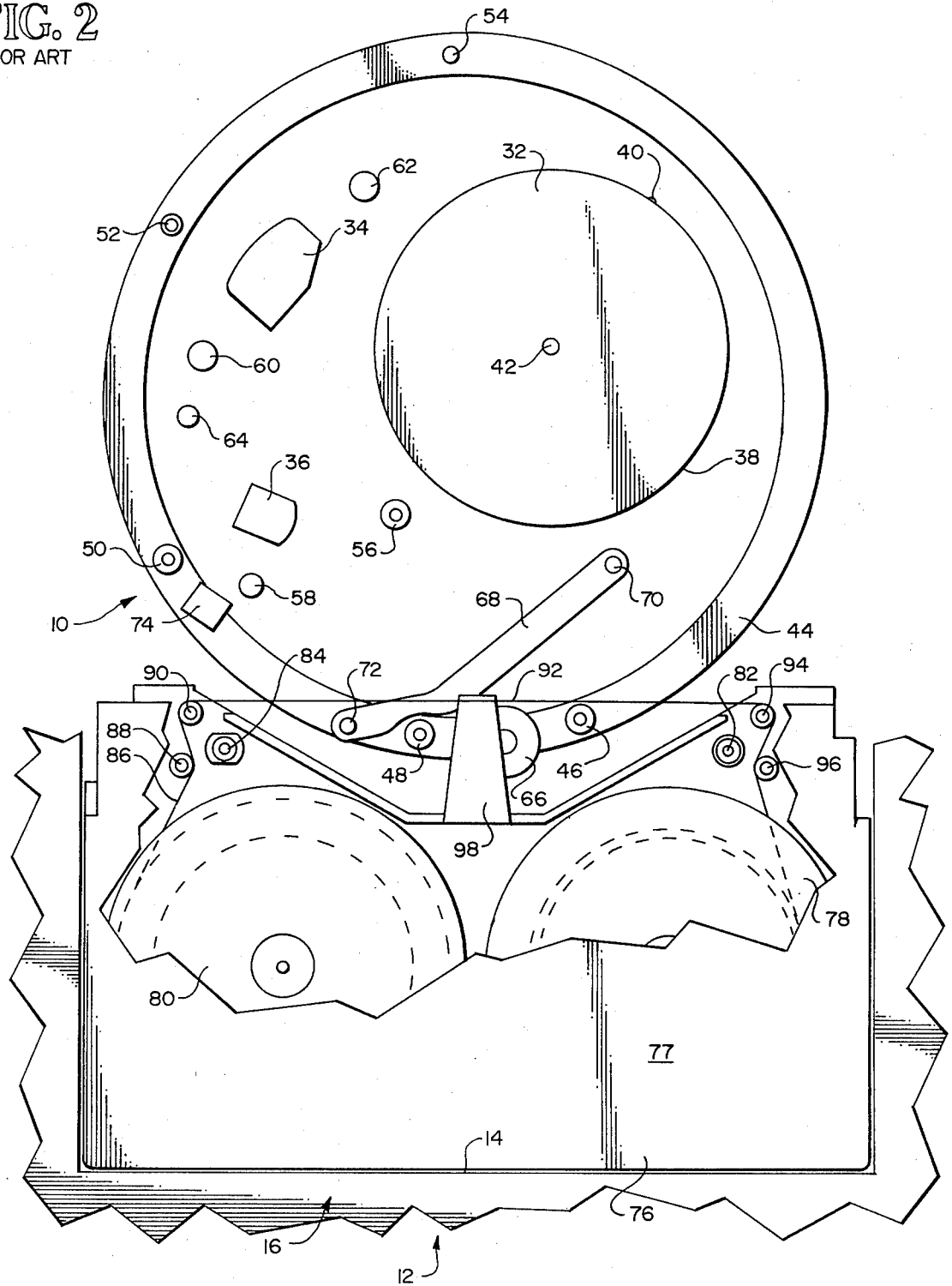
FIG. 2 is a view similar to FIG. 1, showing a tape cassette being installed in the unit shown in FIG. 1.
Figure 3:
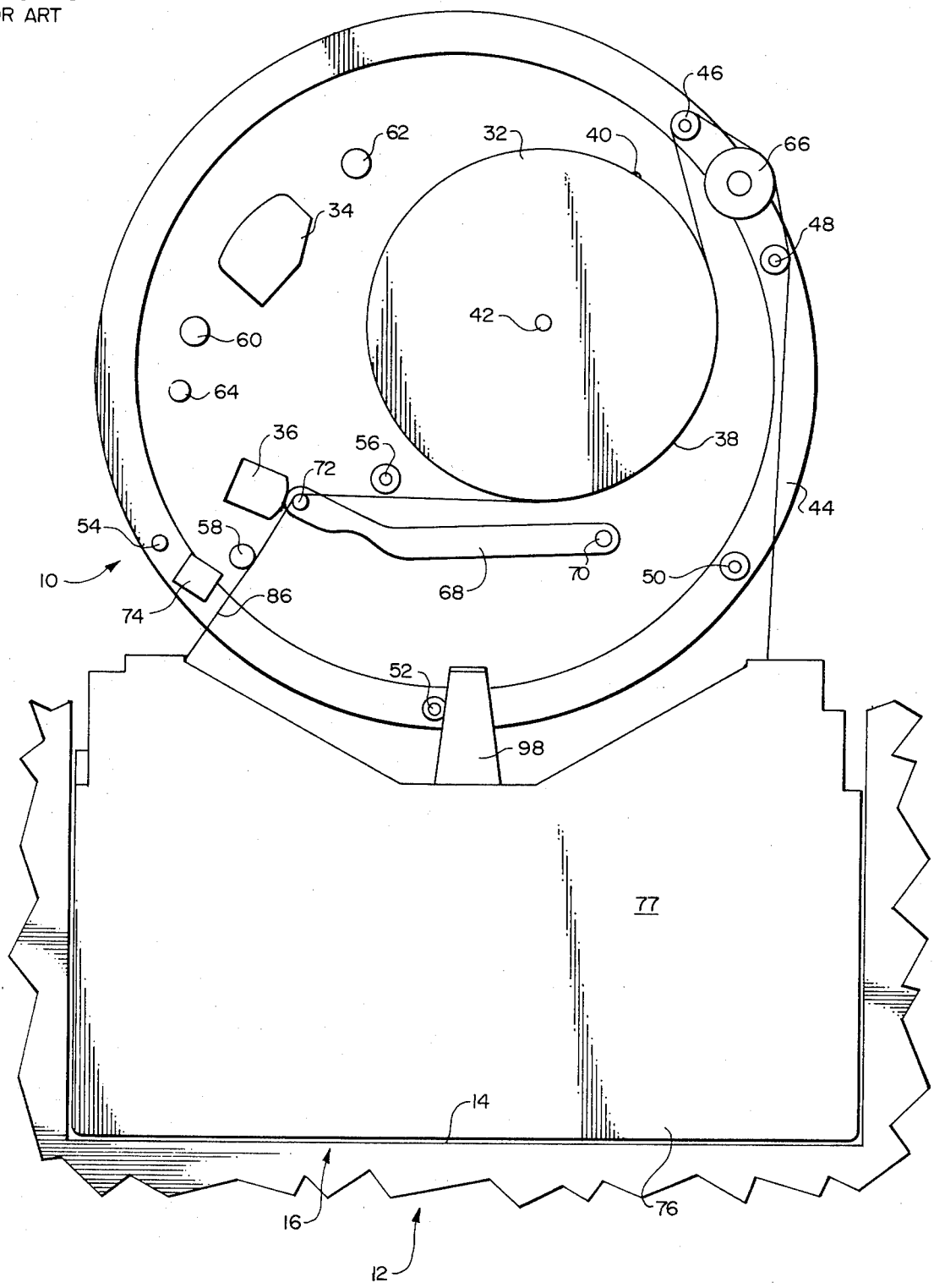
FIG. 3 is a view similar to FIG. 2, showing the guide members of the unit moving the tape outwardly from the cassette toward the full operating position.
Figure 4:
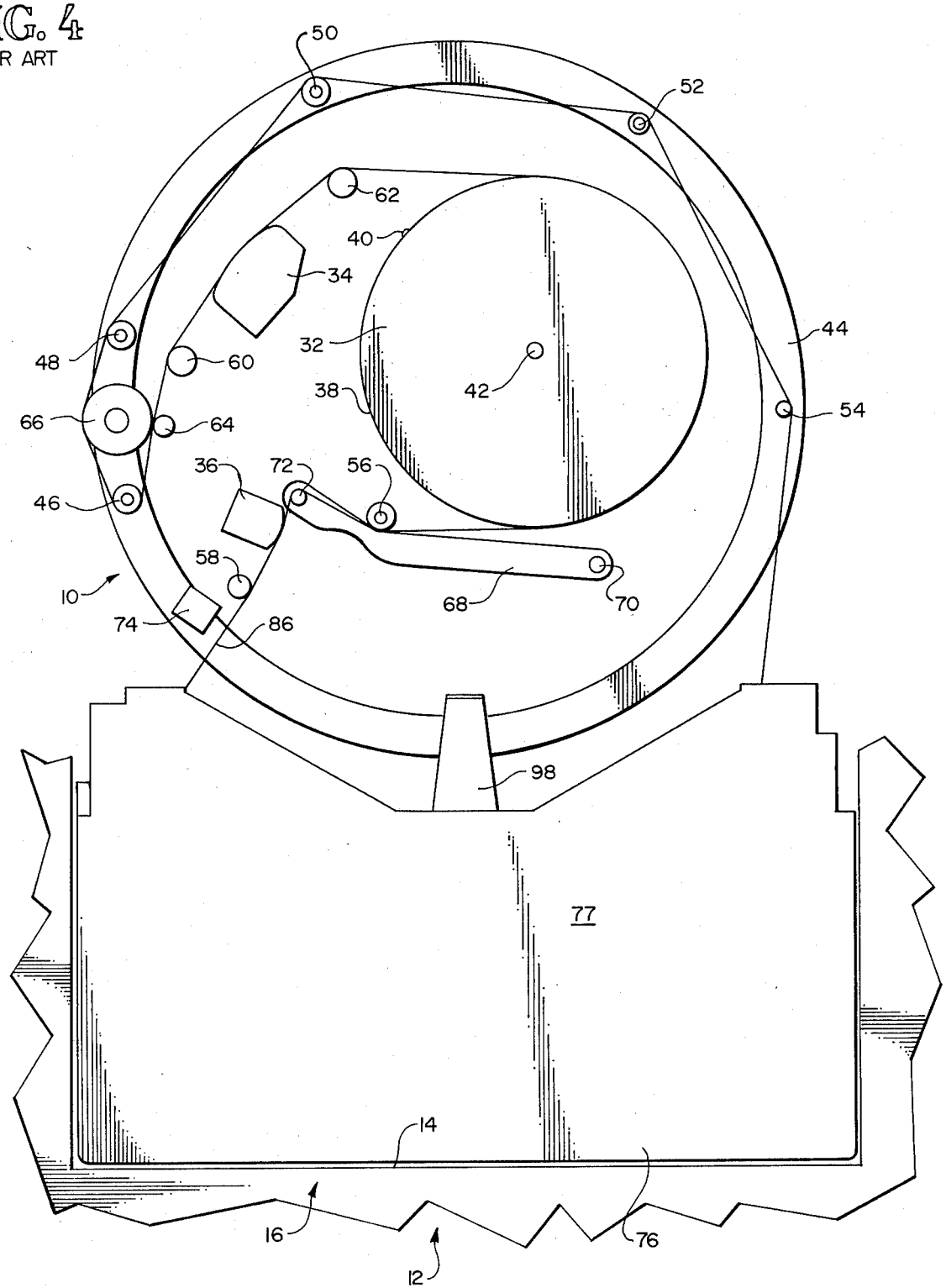
FIG. 4 is a view similar to FIG. 3, showing the guide members having moved the tape to its operating position.

The unit 10 has a main housing 12, which provides a recess 14 to receive a tape cassette 16 (shown in FIGS. 2 through 4). With further reference to FIG. 1, there is a first right take-up spindle 18 and a second left rewind spindle 20 located within the recess 14. Each of the spindles 18 and 20 have a plurality of sprocket teeth 22 to engage a related spool of a tape cassette, and an intermediate ring 24 to support a related spool. Also secured to each spindle 18 and 20 is a related drive ring 26 which is adapted to engage a related drive roller 28. At the left spindle 20, there is also a brake member 30 which is adapted to engage the left drive ring 26 and stop rotation of the left spindle 20.

Located forwardly of the recess 14 is an operating area where there are three magnetic operating components which either respond to the magnetic signals on a tape, affect the magnetic signals on a tape, or do both. These magnetic operating components are: a video head 32, an audio head 34 and an erase head 36. The video head 32 can operate either as a playback head or a recording head. The video head 32 has the general configuration of a circular disc (i.e. a shallow cylinder), and has a peripheral cylindrically shaped operating surface 38. On the peripheral surface 38 there are one or more scanning elements 40, and the head 32 rotates about the center axis 42 of the cylindrical surface 38.

The audio head 34 operates on the audio portion of a tape to either play back audio signals on the tape (in the playing mode) or to record audio signals on the tape when the unit 10 is in its recording mode. The erase head 36, as its name implies, is operated to cause erasure of the magnetic signals on the tape.

Positioned circumferentially around the heads 32, 34 and 36 is a relatively large circular guide ring 44. At selected locations on the guide ring 44, there are five guide elements, numbered 46, 48, 50, 52 and 54, respectively. In operation, this guide ring 44 rotates about its center axis so that the various guide elements 46 through 54 engage the tape to move it outwardly into engagement with the heads 32 through 36.

In addition to the movable guide elements 46 through 54, there are four stationary guide elements, designated 56, 58, 60 and 62, respectively. A capstan 64 is positioned at a fixed location at the left side of the operating area, and a pinch roller 66 is mounted to the rear part of the ring 44 so as to be movable with the ring 44. As will be disclosed later therein, the ring 44 rotates the pinch roller 66 to a position where it can come into engagement with the capstan 64 so as to be able to move the playing or recording tape through the unit 10.

There is a locating arm 68 pivotally mounted at 70 to the stationary structure. At the outer or swing end of the arm 68, there is a movable guide member 72. Finally, there is a stop mechanism which comprises a sensing element 74. This sensing element 74 is stationary and is positioned a moderate distance above the ring 44, so that the ring 44 is able to rotate without the guide elements 50, 52, and 54 coming into contact with the sensing element 74.

To describe the usual operation of the prior art unit 10 described above, reference is now made to FIGS. 2 through 4. In FIG. 2, it can be seen that a tape cassette 16 has been placed in the recess 14. This cassette 16 comprises a housing 76, the top cover 77 of which is broken away to show the main components of the cassette 16. There is a right take-up spool 78 that mates with the right spindle 18 and a left rewind spool 80 that mates with the left spindle 20. The housing 76 is provided with right and left locating holes to receive, respectively, right and left locating pins 82 and 84.

The cassette housing 76 carries a playing/recording tape 86 which is wound on the two spools 78 and 80. This tape 86 extends from the left side of the left spool around two left forward guide members 88 and 90 in the housing 76, and thence across the forward part of the cassette housing at 92. The tape 86 on the right side of the housing 76 engages two right forward guide members 94 and 96 to wind onto the right side of the right spool 78. At the middle forward part of the housing 76, there is a stationary locating finger 98 that properly positions the forward tape portion 92 at the front of the housing 76. The finger 98 is positioned moderately above the top edge of the front tape portion 92 and has a downwardly extending member (not visible in FIGS. 2 through 4) which actually engages the back side of the front tape portion 92.

The guide ring 44 is mounted in the unit 10 in a manner that it is slanted downwardly to the left, as seen in FIGS. 1 through 4. Thus, the left part of the ring 44 is at a lower location, the forward and rear portions of the ring 44 are at intermediate elevations, and the right portion of the ring 44 is at the highest location. Also, the center of rotation of the ring 44 is slanted so as to be perpendicular to the plane occupied by the ring 44. When the unit 10 is in its pre-operating position, the various components are in the position shown in FIG. 1. When the cassette 16 is placed in the recess 14, the forward tape portion 92 is positioned immediately forwardly of the two guide elements 46 and 44, the pinch-roller 66 and the guide member 72. As soon as the cassette 16 is placed into the recess 14, a mechanism in the unit 10 is automatically triggered to cause the guide ring 44 to rotate in a counterclockwise direction. At the same time, the locating arm 68 is caused to swing forwardly, and the brake 30 engages the drive ring 26 of the left spindle 20 to prevent rotation of the left spindle 20.

As the ring 44 begins to rotate, the lead guide member 46 engages the rear surface of the forward tape portion 92 to pull the tape 86 outwardly. Since the brake 30 holds the spindle 20 stationary, the tape 86 is unwound from the right spool 78 which in this mode is able to rotate freely in a counterclockwise direction.

In FIG. 3, it can be seen that the ring 44 has rotated moderately more than 90 degrees, so that the tape 86 engages part of the circumferential surface 38 of the video head 32. The ring 44 continues to rotate from the position of FIG. 3 until it reaches its fully extended position, shown in FIG. 4. It can be seen that the ring 44 has rotated nearly three-quarters of a full revolution (i.e. approximately 270 degrees) to reach the position of FIG. 4. As indicated above, the unit 10 is so arranged that it automatically brings the tape 86 to the position of FIG. 4 when the cassette 16 is placed in the recess 14. When it is desired to operate the unit 10, either the play or record button is pressed, and this causes the pinch roller 66 to move a short distance to the right to press the tape 86 against the capstan 58. When the pinch roller 66 engages the capstan 64 the brake 30 releases so as to permit the left spool 80 to rotate. The capstan 58 rotates in a counterclockwise direction to cause the tape 86 to travel along its length in a direction to unwind from the spool 80 and to be wound onto the right spool 82.

At the same time, the right spindle 18 rotates clockwise to rotate the take-up spool 78 to have the tape 86 wound thereon and thus take up the slack in the tape 86. The video head 32 rotates at a relatively high rate of speed (e.g. 1,000 to 2,000 revolutions per minute) so that the element or elements 40 on the head 32 are able to scan the tape 86 as it passes by.

Near the end of the tape which is wound on the left spool 80, there is a piece of metal foil to which the sensing shut-off element 74 is responsive. As this piece of foil on the tape 86 passes by the element 74, this element 74 reacts to cause the drive system of the unit 10 to be deactivated in a manner that the pinch roller 66 moves away from the capstan 64, the take-up spool 78 stops rotating, and the tape 86 remains stationary. To rewind the tape, the rewind button on the unit 10 is pressed so that the left spindle 20 begins to rotate in a counterclockwise direction to rotate the rewind spool 80 in a counterclockwise direction at a relatively high rate of speed and rewind the tape 86 onto the left spool 80. The right end of the tape 86 is fixedly attached to the right spool 78, so that when the tape 86 is totally unwound from the spool 78, it resists further rotation of the rewind spool 80. This triggers a mechanism in the unit 10 to cause the rewind spool 80 to stop rotating.

Then when an eject button is pushed, the ring 44 rotates clockwise back to the position of FIG. 2, and the locating arm 68 retracts to the position of FIG. 2. At the same time, the take-up spool 78 rotates clockwise to wind the remaining portion of the tape 86 onto the right spool 78. With the tape 86 in this position, the cassette 16 is ready for a second playing or recording, in the same manner as indicated above.

One of the problems with such units is the build up of oxides or other foreign particles on the operating components, particularly the video and audio heads 32 and 34. Such contamination can result from, for example, particles of tape being deposited on the playing surface (This can occur especially when there is frequent "stop frame usage" where a frame is held stationary against the rapidly rotating video head 32). Also, dust and other pollutants in the air can cause an accumulation on the operating surfaces of the two heads 32 and 34. It is also desirable that the capstan 64 and pinch roller 66 be cleaned periodically.

As indicated earlier, all of the components which have been described thus far with reference to FIGS. 1 through 4 already exist in the prior art. The present invention is particularly adapted to perform an effective cleaning operation on certain operating components of the unit 10, and this will now be described with reference to FIGS. 5 through 11.

The apparatus of the present invention is provided in the form of a cassette-type cleaner, indicated at 100, and shown in isometric view in FIG. 5. It can be seen that the cleaner 100 comprises a housing structure 102, having the same overall configuration as the housing 76 of the prior art tape cassette 16 previously described. Thus, the housing structure 102 can readily be inserted into the recess 14 of the unit 10.

The housing structure 102 is made up of a main structure 104 and a cartridge 106 which is removably mounted to the main structure 104. The other main components of the cassette cleaner 100 are a cleaning ribbon 108, a right take-up spool 110, a left locating spool 112, and a limiting linkage 114. The main reason for the removable cartridge 106 is to provide for the easy replacement of the cleaning ribbon 108, and this will be described more fully hereinafter.

Figure 8:
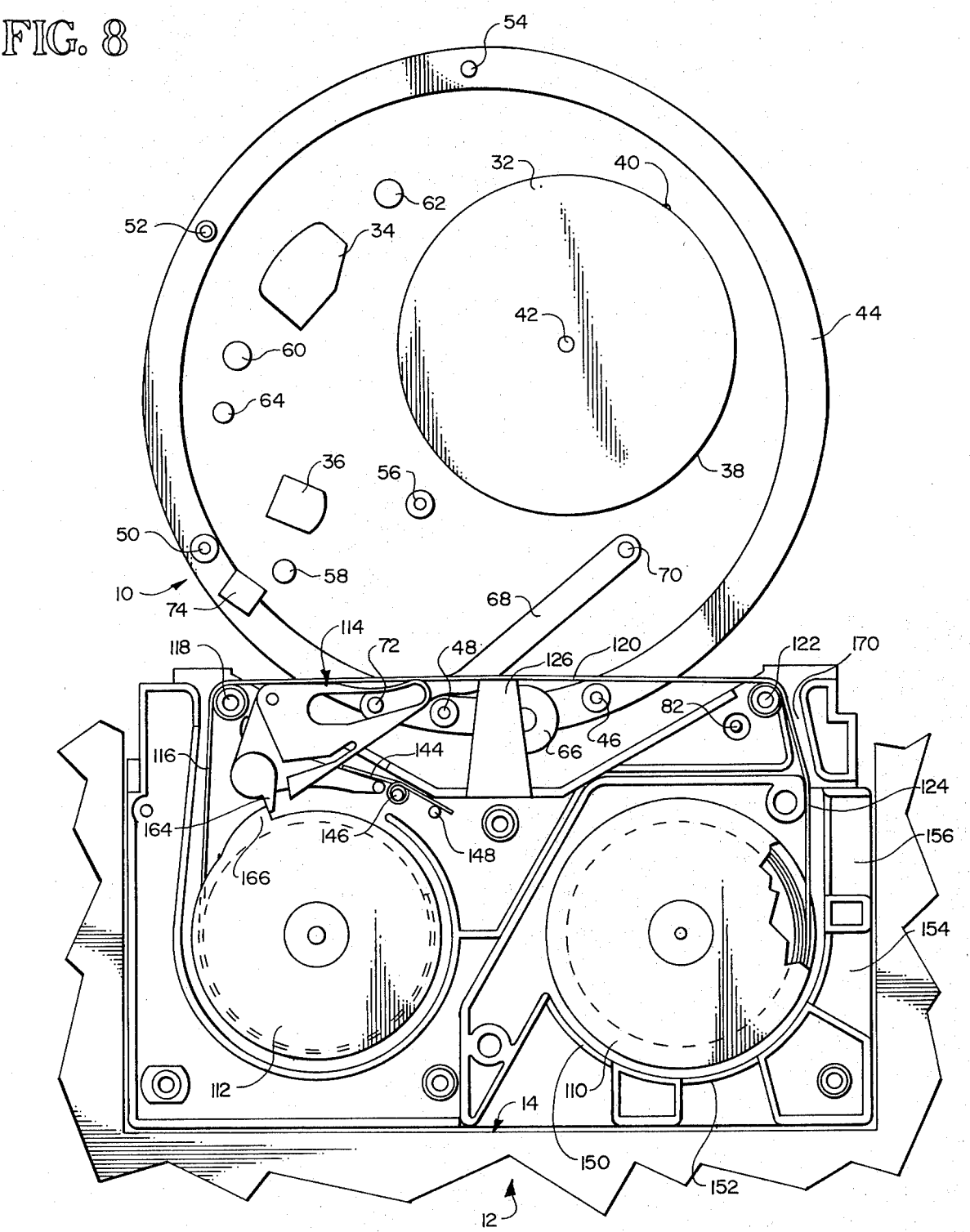
FIG. 8 is a view similar to FIG. 2, but showing the device of the present invention installed in the video player/recorder unit of FIG. 1, and with the top cover removed for purposes of illustration.

To further describe the cassette cleaner 100, reference is now made to FIG. 8, where the cassette cleaner 100 is shown just having been placed in the recess 14 of the unit 10, so that there has been no rotation of the ring 44 nor extension of the locating arm 68. Tne right spool 110 is mounted in the cartridge 106 and is adapted to receive the right spindle 18. The spool 110 has a relatively large diameter, and in the position of FIG. 8, the cleaning ribbon 108 is wound approximately three times around the circumference of the spool 110. The left locating spool 112 also has a relatively large diameter, and the cleaning ribbon 108 is wound approximately more than halfway around the left spool 112. The cleaning ribbon 108 extends from the left side of the spool 112 forwardly as at 116 to a left forward guide roller 118, thence at 120 across the forward portion of the housing structure 102 to a right front guide roller 122, thence rearwardly at 124 to the right side of the spool 110 to be wound thereon. At the middle forward portion of the housing structure 102, there is a locating finger 126 which is quite similar in structure and function to the finger 98 of the conventional tape cassette housing 76. There is a protecting lid 128 that extends across the entire forward part of the housing structure 102. This lid 128 is pivotally mounted at end locations 130 and 132 to the right and left forward portions of the housing structure 102. This lid 128 is shown in its closed position in FIG. 6, where it covers the forward ribbon portion 120, and in its raised open position in FIG. 6.

Figure 9:
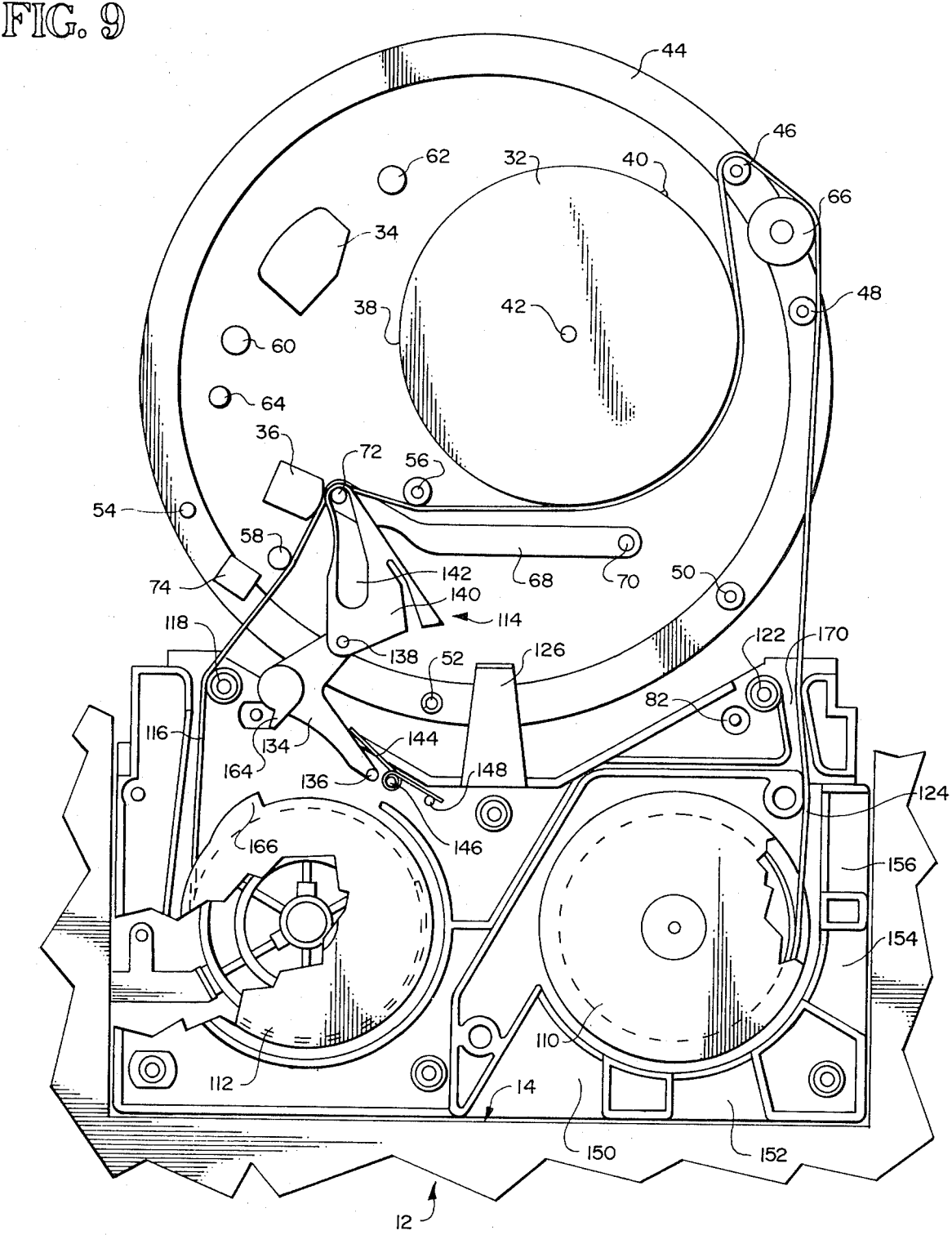
FIG. 9 is a view similar to FIG. 8, showing the guide members of the unit moving the cleaning ribbon of the present invention outwardly into cleaning engagement with the components of the unit.
Figure 10:
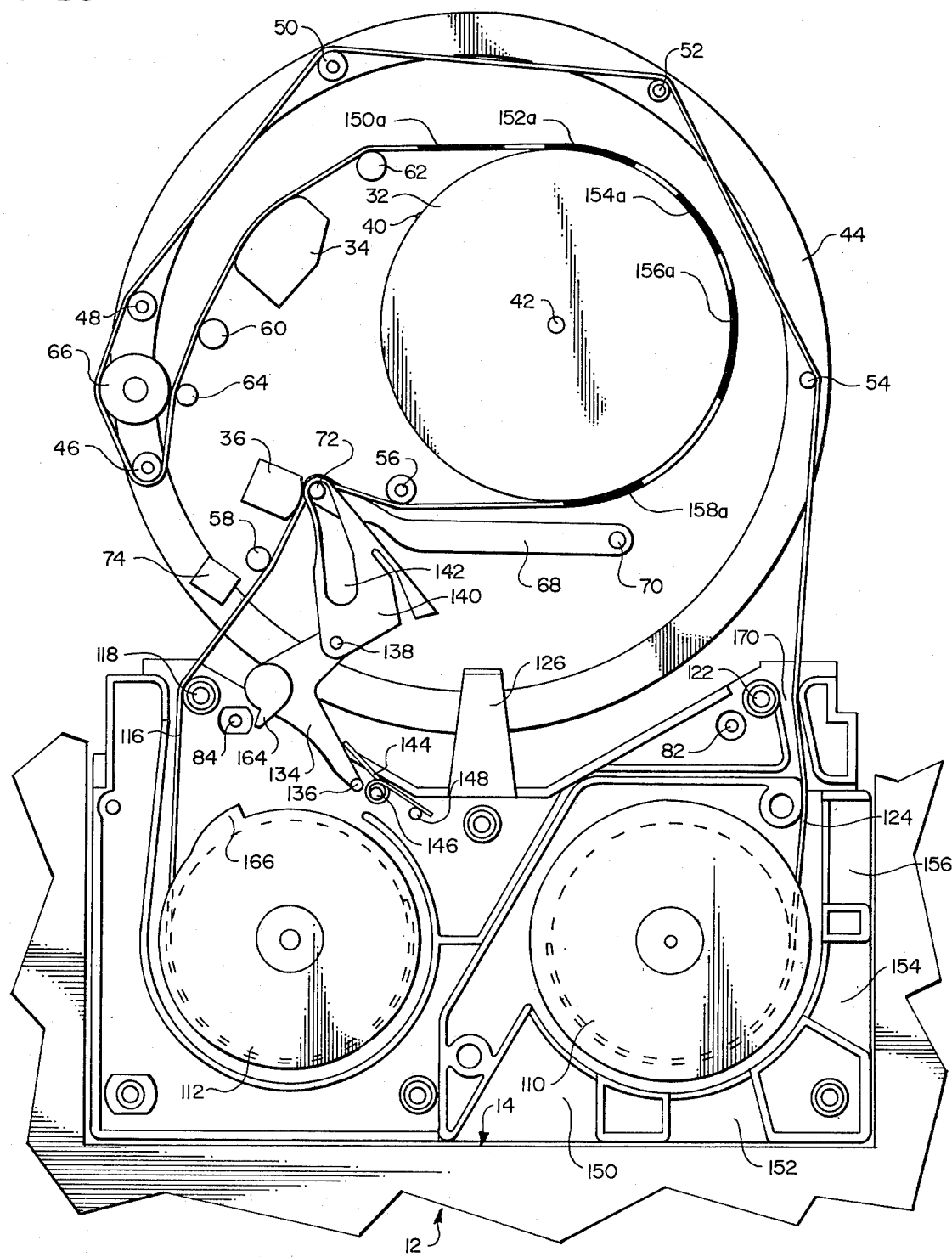
FIG. 10 is a view similar to FIG. 9, showing the cleaning ribbon having been moved to its full cleaning position.

The previously mentioned limiting linkage 114 can best be seen in FIGS. 9 and 10, but is not shown in FIG. 6 for ease of illustration. This linkage 114 comprises a first link 134 pivotally mounted at 136 to the main housing structure 104. The outer end of the link 134 has a second pivot connection 138 to a second link 140. The second link 140 has an elongate through-slot 142 which receives the upstanding guide member 72 that is positioned at the swing end of the locating arm 68 of the unit 10. The reason for the lengthened configuration of the slot 142 is that in different units 10, the locating arm 68 has different locations, so that the retracted position of the guide member 72 (which position is shown in FIG. 8) varies from unit to unit. Accordingly, the slot 142 is arranged to accomodate the varying locations of the movable guide member 72.

The limiting linkage 114 has a retracted position, shown in FIG. 8, and there is provided a spring member 144 which presses against the first link 134 to move it toward the retracted position. Specifically, this spring member 144 has a middle coiled portion mounted to a pin 146, with two outwardly extending arms, one of which engages a second pin 148, and the other of which presses the link 134 rearwardly.

The housing structure 102 is provided with a plurality of access openings, which are called wetting windows, and in the present embodiment there are five windows 150, 152, 154, 156 and 158. The reason for these windows 150 through 158 is that the cleaning ribbon is made of an absorbant material suitable for cleaning, such as a synthetic chamois material. It is important to apply a cleaning solution (generally a liquid cleaning solution) to those parts of the cleaning ribbon 108 that come into engagement with the components of the unit 10 which are to be cleaned. However, it is not desirable to apply an excess amount of cleaning solution to the ribbon 108. Thus, the wetting windows 150 through 158 are provided to not only give access to wet the ribbon 108, but also to indicate the optimum location of the wetted portions of the ribbon 108.

In the particular configuration shown herein, four of the windows 150 through 156 are provided at the periphery of the cartridge 106. Specifically, the two windows 150 and 152 are at the rear part of the cartridge 106, and the two windows 154 and 156 are at the right side portion of the cartridge 106. The fifth window 158 is formed in the forward right portion of the lid 128. Thus, all five windows 150 through 158 are formed in the right side of the housing structure 102. It is to be understood that the number, size and location of these windows 150 through 158 can be varied to accommodate other video units.

Reference is now made to FIG. 7 which shows the bottom surface of the cassette cleaner 100. It will be noted that the locating spool 112 has four tabs 160 extending downwardly from the bottom side of the spool 112. One of these tabs, designated 160a, protrudes outwardly radially further than the other three tabs 160, so that the tab 160a is able to engage a stop member 162. The purpose of this stop member 162 is to enable the spool 112 to be turned to a predetermined starting location prior to when the cassette cleaner 100 is mounted in the recess 14 to perform its cleaning operation.

With reference to FIG. 8, it will be noted that there is a stop member 164 mounted to the outer end of the first link 134 of the limiting linkage 114. This stop member 164, in the position of FIG. 8, engages a matching stop member 166 to prevent clockwise rotation of the spool 112. However, when the limiting linkage 114 extends, as in FIG. 9, the stop member 164 becomes disengaged to permit clockwise rotation of the spool 112.

A foil piece 169 is fixedly secured to the ribbon 108 at a location spaced a short distance from the end portion of the ribbon that is adjacent to the spool 112. This foil piece 169 is provided to activate the sensing element 74 of the shut-off mechanism to stop further travel of the ribbon 108 at the completion of the cleaning cycle.

As indicated earlier, the housing structure 102 is made up of a main structure 104 and a removable cartridge 106. These components can be seen more clearly in FIG. 6, where the cartridge 106 is shown removed from the main structure 104.

As indicated previously, the cleaning ribbon 108 remains permanently attached to the right spool 110 in the cartridge 106. The opposite end of the ribbon 108 is provided with an attaching slot 167 that can be attached to an attaching strip 168 that is permanently attached to the left spool 112. To mount the cartridge 106 to the structure 104, first the ribbon 108 is unwound from the right spool 110 in the cartridge 106, passed through the right front through opening 170 in the housing structure 104, and then attached to the strip 168, as indicated in FIG. 6.

To mount the cartridge 106 into the structure 104, there is provided a small pin 172 protruding downwardly from the lower right front wall portion of the cartridge 106 (see FIG. 5a), and this fits into a matching hole 174 in the right front portion of the lower wall of the structure 104. Then the cartridge 106 is swung clockwise, as seen in FIG. 6, into the position shown in FIG. 5. The middle rear portion of the structure 104 is provided with upper and lower recesses (the lower one being shown at 176 in FIG. 6), and these match with upper and lower protrusions or dimples 178 to hold the cartridge 106 in place. The front and left upper edge portions 180 of the cartridge 106 are recessed slightly to fit under the matching edge portions 182 of the structure 104 so as to hold the cartridge 106 securely in position.

To remove the cartridge 106 from the structure 104, there are upper and lower thumb grips 184 which are adjacent the dimples 178 on the cartridge 106. These are squeezed toward one another to disengage the dimples 178 from the recesses 176. Then the cartridge 106 can be swung away from the structure 104 and removed to the position of FIG. 6. The ribbon 108 is then detached from the strip 168, and another cartridge can be put into place. As indicated previously, this replacement cartridge would be used when the ribbon 108 on the other cartridge has become dirty or worn to the extent that it loses its capability of cleaning properly.

To describe the operation of the cassette cleaner 100, let it be assumed that the cartridge 106 is properly in place, as shown in FIG. 5. The first step is to properly position the cleaning ribbon in the housing structure 102.

To position the ribbon 108 properly for its cleaning operation, first the cassette cleaner 100 is turned to position its bottom side up, as shown in FIG. 7. Next, the right spool 110 (which is at the left in FIG. 7) is rotated to take up all slack in the ribbon 108 so that the forward portion 120 of the ribbon 108 extends in a straight line across the front portion of the cleaner 100, as shown in FIGS. 7 and 8. Next, the left locating spool 112 (shown at the right side in FIG. 7) is turned in a direction which in FIG. 7 is clockwise, to wind a portion of the ribbon 108 onto the spool 112. The turning continues until the tab 160a engages the stop member 162. At this position, the cleaning ribbon 108 is in proper location for having the cleaning solution applied thereto.

To apply the cleaning solution, the front lid 128 is placed in its down position (as shown in FIG. 5) so that the front window 158 is positioned in front of the ribbon 108. A typical cleaning solution would be, for example, a solution of alcohol and a liquid fluorocarbon. The cleaning solution is applied in a conventional manner through the five windows 150 through 158 to the portions of the ribbon 108 that are exposed through these windows 150 through 158. For example, this can be done with an elongate applicator having a sponge-like member on its outer end that absorbs the cleaning fluid in a bottle and can deposit the cleaning fluid on the ribbon 108.

With the cleaning solution so applied through the windows 150 through 158, the forward lid 128 is raised and the cassette cleaner is placed into the recess 14 of the video unit 10.

The cassette cleaner 100, having its housing structure shaped substantially the same as a conventional tape cassette 16, readily fits into the recess 14. The cleaner 100 is provided with positioning holes 185 to fit with matching locating pins in the recess 14 of the unit 10. Immediately after being placed in the recess 14, the cassette cleaner 100 is in the position shown in FIG. 8, with the cleaning ribbon 108 being positioned immediately in front of the two guide elements 46 and 48, and also forward of the pinch roller 66 and the guide member 70.

When the cassette cleaner 100 is placed in the recess 14, this immediately triggers the mechanism in the video unit 10 to cause the guide ring 44 to rotate counterclockwise and the locating arm 68 to swing forwardly about its pivot location 70. At the same time, the brake member 30 engages the drive ring 26 to hold the left spindle 20 and its associated locating spool 112 stationary. The stop member 164 is provided as an optional feature which stops rotation of the spool 112 in the event that the brake member 30 is not properly activated. This stop member 164 is spring-loaded so that the matching stop member 166 on the spool 112 is able to move by the member 164 when the spool 112 is rotated in a counterclockwise direction, as seen in FIG. 8. However, with the two stop members 164 and 166 engaging one another (as shown in FIG. 8), clockwise rotation of the spool 112 is halted until the outward movement of the locating arm 68 moves the limiting linkage 114 outwardly (as shown in FIG. 9) to move the member 164 out of its stop position. As an option, the stop member could be provided at 164a as a part of the link 134.

As the guide ring 44 rotates counterclockwise, the lead guide element 46 pulls the cleaning ribbon 108 forwardly so that it unwinds from the right spool 110, with the left spool 112 remaining stationary. The guide ring 44 moves continuously through the position of FIG. 9 and finally comes to a halt at the location of FIG. 10. This brings the five wetted portions of the cleaning ribbon 108 into a position relative to the video head 32, the audio head 34, the capstan 64 and pinch roller 66 to begin the cleaning cycle. In FIG. 10, the five wetted areas are shown as darkened areas on the ribbon 108, and are given numerical designations corresponding to their previous window locations when in the retracted position, with an "a" suffix designating these as wetted areas. Thus, that portion of the ribbon 108 which was exposed at the window 150 in the position of FIG. 8 is given in FIG. 10 the designation 150a. In like manner, the portion of the ribbon 108 that was exposed at window 152 is designated in FIG. 10 as 152a, with this pattern being repeated up to the location of 158a.

With the ribbon positioned as in FIG. 10, the "play forward" key on the video unit 10 is depressed to cause the pinch roller 66 to move into engagement with the capstan 64 which is rotating in a counterclockwise direction, as seen in FIG. 10. At the same time, the right take-up spool 110 begins to rotate in a clockwise direction, and the brake member 30 moves out of engagement to permit rotation of the spool 112.

With reference to FIG. 10, where the ribbon 108 is positioned at the start of its cleaning cycle, it can be seen that the three wetted portions 158a, 156a and 154a are in contact with the surface 38 of the video head 32. Also, the wetted tape portion 150a is just coming into engagement with the operating surface of the audio head 34. As soon as the player key on the video unit 10 is depressed, the video head begins to rotate at a relatively high rate of speed, thus enhancing the cleaning action of the wetted portions 158a, 156a and 154a. Also the pinch roller 66 presses the ribbon 108 against the capstan 64 to cause linear travel of the ribbon through the unit 10.

Figure 11:
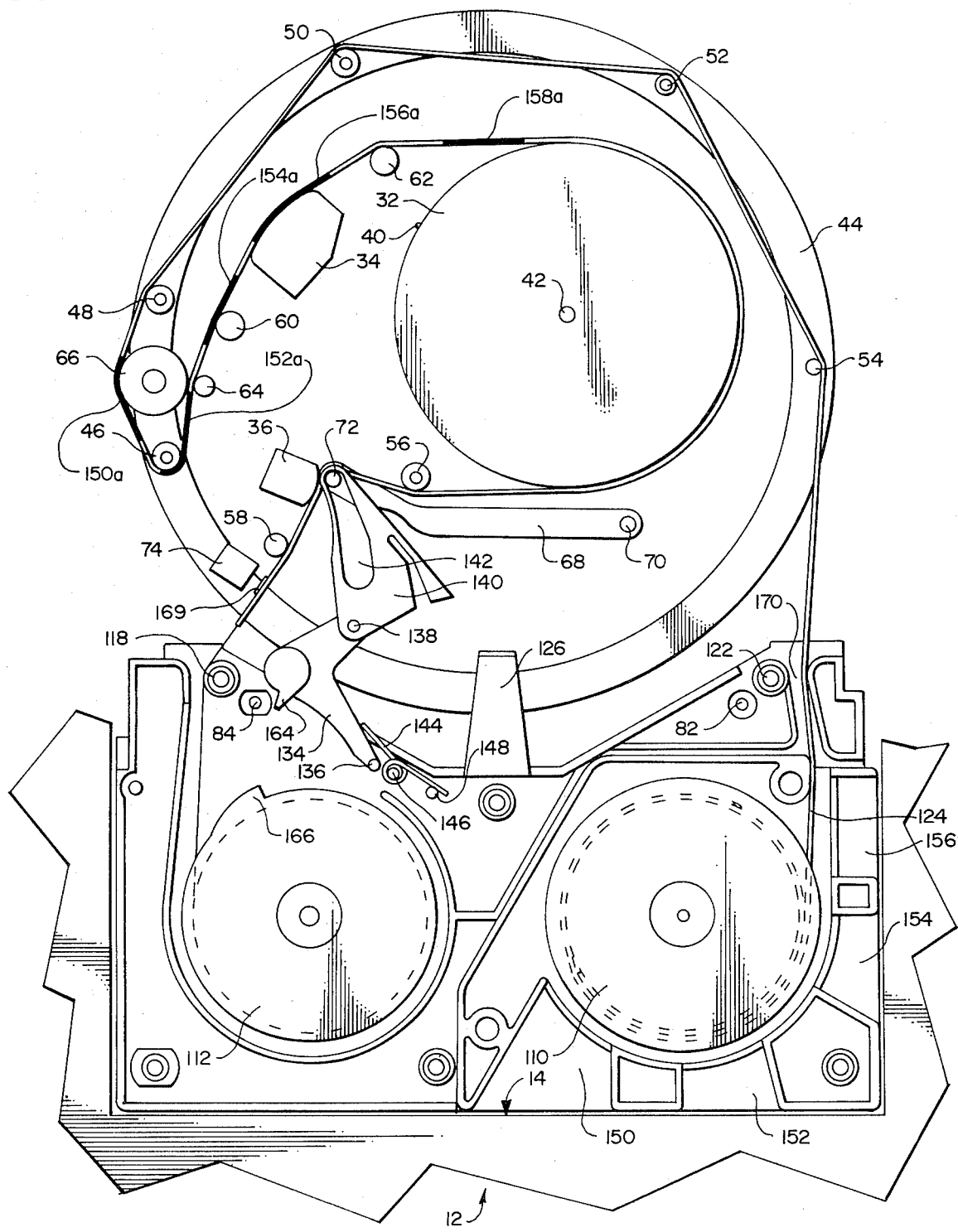
FIG. 11 is a view similar to FIG. 10, showing the cleaning ribbon completing its travel along its cleaning path.

The cleaning ribbon travels from the position of FIG. 10 approximately three to five inches along its length to the position of FIG. 11. It can be seen that the wetted portions of the ribbon 108 have moved past the audio head 34 and through the capstan 64 and pinch roller 66 to clean these components. At this time, the foil portion 169 passes adjacent the sensing element 74 to activate the shut-off mechanism so that the pitch roller 66 moves a short distance away from the capstan 64 to release the ribbon 108. Immediately after this, the guide ring rotates clockwise back to its original position of FIG. 8, and the right take-up spool turns clockwise to wind the ribbon 108 onto the spool 110. Also, the locating arm 68 retracts to the position of FIG. 8, with the linkage 114 also retracting, due to the action of the spring member 144.

When the various components are back to the position of FIG. 8, then the cassette cleaner 100 is simply removed from the recess 14. To prepare the cleaner 100 for a subsequent operation, it is simply turned over and the spool 112 rotated to the position shown in FIG. 7. After that, the ribbon 108 at the various locations can again be wetted and a subsequent cleaning cycle can be accomplished as described above.

What is claimed is:

1. A device adapted to clean a playing and/or recording apparatus, where there is:
    (a) a main housing adapted to receive a tape cassette in an operating location, with the cassette having a forward portion, first and second side portions, and first and second spools at said first and second side portions, respectively,
    (b) at least one head member having a head surface that is subject to contamination,
    (c) guide means having a first retracted position and adapted to engage a tape at the forward portion of the cassette and move said tape to a second operating position to locate the tape in operating engagement with the head member, said apparatus being arranged so that the tape is unwound from at least said first spool as said tape is moved from its retracted position to its operating position, (d) a power system to move the tape relative to the head as said tape is wound from one of said spools to the other, said device adapted to clean at least said head surface, said device comprising:
(a) a cassette housing adapted to be mounted to said main housing and comprising a forward housing portion and two opposite side housing portions,
(b) a cleaning ribbon which has a retracted precleaning position in said housing, said ribbon having a guide engaging portion which in the precleaning position is located at a forward portion of said cassette housing, and a cleaning portion spaced from the guide engaging portion,
(c) a locating spool rotatably mounted in one side portion of said housing and adapted to engage one end of said ribbon,
(d) a take-up spool rotatably mounted in the other side housing portion and adapted to engage a second end of said ribbon,
(e) said ribbon in its precleaning position having its cleaning portion positioned adjacent said take-up spool in the other side of said housing,
(f) locating means operatively positioned relative to said locating spool in a manner to enable said locating spool to be rotated to a location where said ribbon is positioned at its precleaning position
(g) said housing being provided with access opening means proximate said take-up spool to permit access to the cleaning portion of the ribbon for application of a cleaning material thereto,
(h) the guide engaging portion and the cleaning portion of said ribbon being located in the precleaning position in a manner that the guide means in moving from its operating position engages the guide portion of the ribbon and moves the ribbon outwardly into a cleaning position, with said power system of the apparatus engaging the ribbon to move said ribbon relative to the head through a cleaning cycle.

2. The device as recited in claim 1, wherein there is a positioning member adapted to operatively engage said locating spool to position the locating spool in its precleaning position.

3. The device as recited in claim 1, wherein said take-up spool and said housing are provided with cooperating stop means which come into engagement when said take-up spool has been rotated to its precleaning position.

4. The device as recited in claim 1, wherein said playing and/or recording apparatus has a stop mechanism responsive to a tape-actuating means on the tape, said device further comprising ribbon stop means mounted to said ribbon and adapted to activate the stop mechanism to stop the ribbon at completion of the cleaning cycle of the ribbon.

5. The device as recited in claim 1, wherein:
(a) said take-up spool and said housing are provided with cooperating stop means which come into engagement when said take-up spool has been rotated to its precleaning position
(b) said playing and/or recording apparatus has a stop mechanism responsive to a tape-actuating means on the tape, said device further comprising ribbon stop means mounted to said ribbon and adapted to activate the stop mechanism to stop the ribbon at completion of the cleaning cycle of the ribbon
(c) there is a limiting means adapted to operatively engage at least a portion of said guide means as said guide means moves to its second position so as to restrain said portion of the guide means at a third intermediate position where said ribbon in its cleaning position is in a more relaxed curved path relative to the curved path of the tape, whereby there is reduced frictional resistance to movement of said ribbon in its cleaning position.

6. The device as recited in claim 1, wherein said housing comprises a main housing portion and a cartridge which is removably mounted to said main housing portion, said locating spool being rotatably mounted in the main housing portion, and said take-up spool being rotatably mounted to the cartridge, said ribbon having a detachable connecting means by which the ribbon can be connected to the locating spool, whereby said ribbon can be replaced by providing a second cartridge with a second ribbon.

7. A method of performing a cleaning operation on a playing and/or recording apparatus, where there is:
(a) a head member which has a head surface that is subject to contamination;
(b) guide means movable between a first retracted position and a second operating position to move a tape into operating engagement with said head member, said method adapted to clean at least said head surface, said method comprising:
(a) providing a housing adapted to be mounted in an operating position relative to said apparatus,
(b) providing a cleaning ribbon which has a cleaning portion and which is mounted in said housing so as to have a retracted precleaning position at which said cleaning portion is positioned at a precleaning location in the housing,
(c) providing said housing with access opening means at the precleaning location in the housing,
(d) positioning said cleaning ribbon in its precleaning position where said cleaning portion of the ribbon is positioned at the access opening means of the housing,
(e) applying a cleaning material to the cleaning portion of the ribbon,
(f) mounting the housing to the apparatus and operating the apparatus to cause the guide means to engage the ribbon and cause the cleaning portion with the cleaning material thereon to engage the head surface.

8. The method as recited in claim 7, further comprising providing at least one spool in said housing on which at least a portion of said ribbon is wound, then positioning said ribbon at its cleaning location by rotating said spool to a predetermined precleaning location.

9. The method as recited in claim 8, wherein said spool is rotated to its cleaning position until stop means on said spool engages cooperating stop means on said housing to position the spool at the location where the stop means engage one another.

10. The method as recited in claim 7, wherein said playing and/or recording apparatus has a drive system to move said tape through said apparatus and a stop mechanism responsive to a stop actuating means on said tape, said method further comprising providing said ribbon with stop means which in the precleaning position is spaced from said stop mechanism, thereafter engaging said ribbon with said drive system to move said ribbon along its length so as to cause relative motion between said ribbon and said head surface.

11. The method as recited in claim 7, wherein said playing and/or recording apparatus is so arranged that as said guide means moves to its second operating position, said tape is caused to be positioned in a predetermined curved path, said method further comprising limiting movement of at least a portion of said guide means as said guide means moves to its second position so as to restrain said portion at a third intermediate position where said ribbon in its cleaning position is in a more relaxed curved path relative to the curved path of the tape, whereby there is reduced frictional resistance to movement of the ribbon to its cleaning position.

12. The method as recited in claim 7, wherein:
(a) there is provided at least one spool in said housing on which at least a portion of said ribbon is wound, then positioning said ribbon at its cleaning location by rotating said spool to a predetermined precleaning location until stop means on said spool engages cooperating stop means on said housing to position the spool at the location where the stop means engage one another,
(b) said playing and/or recording apparatus has a drive system to move said tape through said apparatus and a stop mechanism responsive to a stop actuating means on said tape, said method further comprising providing said ribbon with stop means which in the precleaning position is spaced from said stop mechanism, thereafter engaging said ribbon with said drive system to move said ribbon along its length so as to cause relative motion between said ribbon and said head surface, and
(c) said playing and/or recording apparatus is so arranged that as said guide means moves to its second operating position, said tape is caused to be positioned in a predetermined curved path, said method further comprising limiting movement of at least a portion of said guide means as said guide means moves to its second posiiton so as to restrain said portion at a third intermediate position where said ribbon in its cleaning position is in a more relaxed curved path relative to the curved path of the tape, whereby there is reduced frictional resistance to movement of the ribbon to its cleaning position.

13. A device adapted to clean a playing and/or recording apparatus where there is:
a. a main housing adapted to receive a tape cassette in an operating location;
b. at least one rotating head member having a head surface that is subject to contamination;
c. guide means having a first retracted position and adapted to engage a tape in the cassette and move to a second position to move said tape into operating engagement with the head member
said device adapted to clean at least said head surface, said device comprising:
a. a cassette housing adapted to be mounted to said main housing in said operating location and having a forward housing portion;
b. a cleaning ribbon which has a cleaning portion;
c. said housing defining access opening means to expose the cleaning portion of the ribbon at a precleaning location in the housing to permit a cleaning material to be applied to the cleaning portion of the ribbon;
d. said cassette housing having mounting means to mount the ribbon in a retracted precleaning position where the cleaning portion of the ribbon is located at said precleaning location and, with the cassette housing in the operating location, the ribbon is positioned to be engaged by the guide means in moving from its first to its second position to be carried by the guide means so as to be extracted from within said cassette housing to an extended cleaning position of the ribbon, where the cleaning portion of the ribbon comes into cleaning engagement with the head surface.

14. The device as recited in claim 13, wherein said ribbon has a guide engaging surface portion which, in the retracted precleaning position, is located at the forward housing portion of the cassette housing to be engaged by said guide means moving from its first position to its second position to move the ribbon to its extended cleaning position.

15. The device as recited in claim 14, wherein said ribbon has a lengthwise axis and is movable along its lengthwise axis in said cassette housing, said device further comprising locating means mounted to said cassette housing and operatively connected to said ribbon to locate said ribbon along its lengthwise axis in its retracted precleaning position in the cassette housing.

16. The device as recited in claim 15, wherein said locating means further comprises a positioning member to position said locating means to locate said ribbon along its lengthwise axis in its precleaning position.

17. The device as recited in claim 15, wherein said locating means comprises a rotatably mounted spool engaging said ribbon, said spool being arranged relative to said ribbon to be able to be rotated to a desired precleaning position where said ribbon in located along its lengthwise axis at a desired location in its precleaning position.

18. The device as recited in claim 17, wherein said spool and said cassette housing are provided with cooperating stop means which come into engagement when said spool has been rotated to its precleaning position.

19. The device as recited in claim 13, wherein said playing and/or recording apparatus has a drive system to move the tape of the tape cassette through said apparatus when operating in a playing and/or recording mode, and a stop mechanism responsive to a stop actuating means on said tape, said mounting means of the device being arranged to position the ribbon so as to be engaged by said drive system when said device is at the operating location in the apparatus to move the ribbon in its extended cleaning position relative to said head through a cleaning cycle, said ribbon having a ribbon stop means adapted to activate said stop mechanism to stop said ribbon at completion of said cleaning cycle of said ribbon.

20. The device as recited in claim 19, further comprising locating means mounted to said cassette housing and operatively connected to said ribbon to move said ribbon along a lengthwise axis of said ribbon in said housing to a desired lengthwise location in its precleaning position in the cassette housing, at which lengthwise location said ribbon stop means is spaced along the lengthwise axis of the ribbon from the stop mechanism of the apparatus, in a manner that said drive system is able to engage said ribbon in its precleaning position and move it through it cleaning cycle.

21. The device as recited in claim 13, wherein said playing and/or recording apparatus is so arranged that in a playing and/or recording mode, as said guide means moves to its second position, the tape is caused to be positioned in a predetermined curved path when in operating engagement with the head member, said device further comprising a limiting means adapted to operatively engage at least a portion of said guide means as said guide means moves to its second position so as to restrain said portion of the guide means at a third intermediate position where said ribbon in its extended cleaning position is in a more relaxed curved path relative to the curved path of the tape, whereby there is reduced frictional resistance to movement of said ribbon in its extended cleaning position.

22. The device as recited in claim 21, wherein said limiting means comprises a limiting member and spring means acting on said limiting member to urge said limiting member toward a retracted position.

23. The device as recited in claim 21, wherein said limiting means comprises a limiting member having elongate slot means to receive said portion of the guide means at various locations along said slot means, and also comprising spring means acting on said limiting member to urge said limiting member toward a retracted position.

24. The device as recited in claim 21, wherein said limiting means comprises a first link pivotally mounted to said cassette housing and a second link pivotally mounted to said first link and having elongate slot means therein to engage said portion of the guide means at various locations along said slot means, and also comprising spring means to urge said first and second links toward a retracted position.

25. The device as recited in claim 13, wherein said playing and/or recording apparatus has a drive system to move said tape of the tape cassette through said apparatus when operating in a playing and/or recording mode, said ribbon being adapted to be engaged by said drive system when said ribbon is in its extended cleaning position so as to be moved relative to said head through a cleaning cycle, said device further comprising;
 a. a first spool rotatably mounted to said cassette housing and adapted to engage one end of said ribbon;
 b. a second spool rotatably mounted to said cassette housing and adapted to engage a second end of said ribbon;
 c. said spools being rottable to a desired precleaning position where, with said ribbon in its precleaning position, said cleaning portion is located in said cassette housing proximate to at least one of said spools;
 d. said ribbon having a guide engaging surface portion which, in the retracted precleaning position, is located at the forward portion of said cassette housing to be engaged by said guide means moving from its first position to its second position to move said ribbon to its cleaning position;
 e. said access opening means being proximate to said at least one of said spools to permit access to the cleaning portion of the ribbon for application of a cleaning material thereto.

26. The device as recited in claim 25, wherein there is a positioning member adated to operatively engage at least one of said spools to position the spools in a precleaning position.

27. The device as recited in claim 25, wherein at least one of said spools and said cassette housing are provided with cooperating stop means which come into engagement when said at least one of said spools has been rotated to its precleaning position.

28. The device as recited in claim 25, wherein said playing and/or recording apparatus has a stop mechanism responsive to a tape-actuating means on the tape when the apparatus is operating in its playing and/or recording mode, said device further comprising ribbon stop means mounted to said ribbon and adapted to activate the stop mechanism to stop the ribbon at completion of the cleaning cycle of the ribbon.

29. The device as recited in claim 25, wherein:
 a. at least one of said spools and said housing are provided with cooperating stop means which come into engagement when the spools have been rotated to said desired precleaning position;
 b. said playing and/or recording apparatus has a stop mechanism responsive to a tape-actuating means on the tape, said device further comprising ribbon stop means mounted to said ribbon and adapted to activate the stop mechanism to stop the ribbon at completion of the cleaning cycle of the ribbon;
 c. there is a limiting means adapted to operatively engage at least a portion of said guide means as said guide means moves to its second position so as to restrain said portion of the guide means at a third intermediate position where said ribbon in its extended cleaning position is in a more relaxed curved path relative to a curved path assumed by the tape, when a tape cassette is in the apparatus and the tape is in operating engagement with the head member, whereby there is a reduced frictional resistance to movement of said ribbon in its cleaning position.

30. The device as recited in claim 25, wherein said cassette housing comprises a main cassette housing portion and a cartridge which is removably mounted to said main cassette housing portion, said first spool being rotatably mounted in the main housing portion, and said second spool being rotatably mounted to the cartridge, said ribbon having a detachable connecting means by which the ribbon can be connected to the first spool, whereby said ribbon can be replaced by providing a second cartridge with a second ribbon.

* * * * *